March 22, 1960     J. R. STEIGERWALD     2,930,026

SKID WARNING SYSTEM

Filed March 4, 1957     2 Sheets-Sheet 1

INVENTOR.
JOHN R. STEIGERWALD
BY

*R. L. Miller*
ATTORNEY

March 22, 1960  J. R. STEIGERWALD  2,930,026
SKID WARNING SYSTEM
Filed March 4, 1957  2 Sheets-Sheet 2
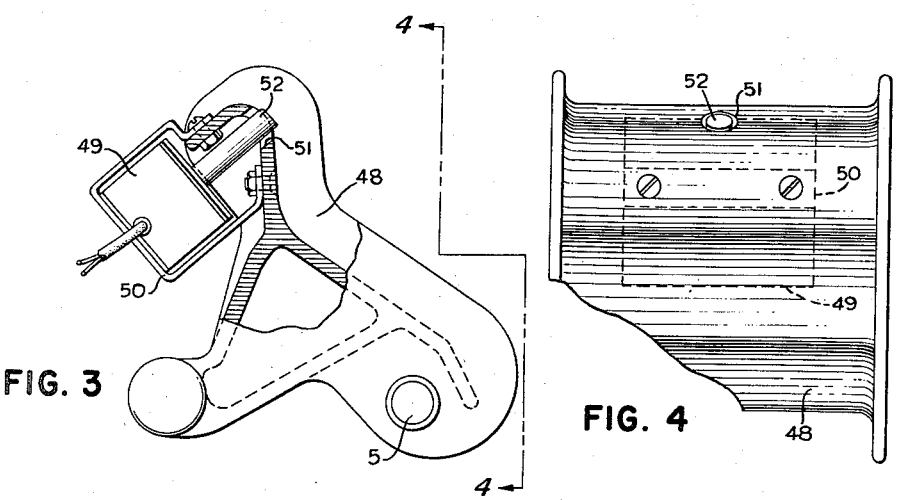
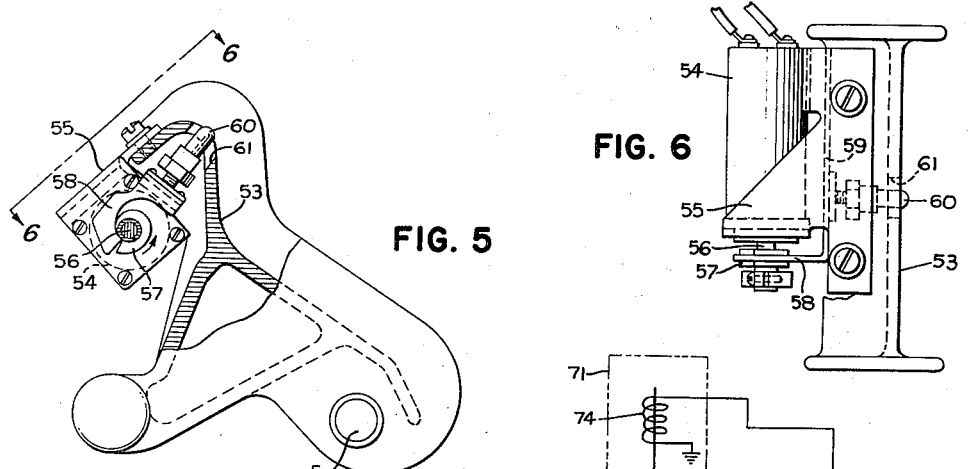
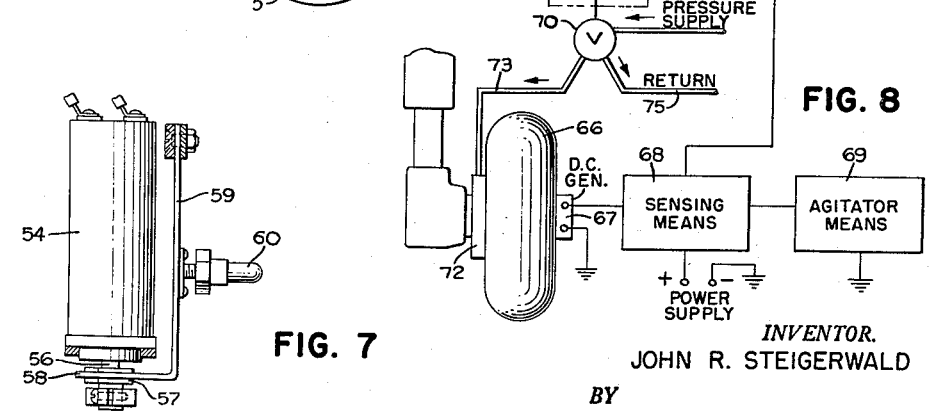
INVENTOR.
JOHN R. STEIGERWALD
BY
P. L. Miller
ATTORNEY

United States Patent Office 2,930,026
Patented Mar. 22, 1960

2,930,026

SKID WARNING SYSTEM

John R. Steigerwald, Canton, Ohio, assignor to The Goodyear Tire & Rubber Company, Akron, Ohio, a corporation of Ohio Application March 4, 1957, Serial No. 643,825

15 Claims. (Cl. 340—52)

This invention relates to wheel slip or skid warning systems, and especially to such warning systems having indicator means therein by which the actuator of a braking mechanism can be mechanically advised of the fact that undesired conditions exist in the braked member.

The present invention particularly relates to apparatus for indicating the existence of skidding, or undesirable slipping conditions in a wheel of a vehicle, such as an aircraft, and it will be so described hereinafter. However, it will be realized that the principles of the invention could be used on any desired type of a vehicle.

When landing an aircraft, it is highly desirable to prevent over-braking actions with consequent undesirable tire slipping or skidding and less braking efficiency. Hence, there have been efforts made heretofore to provide certain controls for a braking action in airplane wheels wherein braking action is automatically limited or is periodically relieved by the controls provided. One of such systems is disclosed in my prior joint patent application Serial No. 451,812 and other systems of this type have been disclosed in patents, such as Patent No. 2,744,699. However, such automatic apparatus is somewhat complex and is rather costly.

The general object of the present invention is to provide a simple, relatively inexpensive slip or skid warning system or apparatus for use in vehicles whereby the actuator of a braking means is physically advised of the fact that undesirable conditions exist on a braked wheel.

Another object of the invention is to warn a person immediately by means physically contacting the person's foot when a braked wheel that he controls is functioning improperly.

A further object of the invention is to provide a skid warning system and apparatus that physically indicates to a person applying a braking force that undesirable action is resulting and to have the person instinctively reduce the braking action with a minimum of psychological action after such indication has been received.

Another object of the invention is to provide a skid warning system that is easy to install on existing aircraft structures; and to provide a skid warning system which aids a pilot in his physical control of braking action for maximum efficiency thereof.

Still another object of the invention is to provide a skid warning system that does not require any extensive certification or approval by Safety Boards controlling or regulating airplanes and activity thereof.

Yet another object of the invention is to provide a braked wheel skid warning system adapted for use with a plurality of braking pedals wherein the braking pedals control different support wheels for the vehicle.

A further object of the invention is to position a mechanical agitator member directly on a brake pedal and to connect such agitator member to sensing means whereby when slip or skid conditions exist in a braked wheel, the mechanical agitator will physically vibrate to shake or contact the foot of the person actuating the brake pedal to warn of undesired action in the braked wheel.

Another object of the invention is to provide an agitator member on a brake pedal and including an agitator pin or member extending through a hole in the brake pedal for direct vibratory contact with the foot of the person actuating the brake pedal, which agitator pin can be controlled either by an electric motor and connecting cam and spring means, by an electromagnetic vibratory device, or by an electrically controlled hydraulic or pneumatic means.

Yet another object of the invention is to provide an auxiliary brake pedal section which can be superimposed upon a standard brake pedal and be caused to be vibrated when undesirable conditions exist on a brake wheel controlled by such brake pedal.

The foregoing and other objects and advantages of the invention will be made more apparent as the specification proceeds.

For a better understanding of the invention, attention now is directed to the accompanying drawings wherein:

Fig. 3 is a side elevation, partially broken away and shown in section, of a brake pedal having a modified agitator member of the invention associated therewith;

Fig. 4 is a fragmentary side elevation of the brake pedal taken on line 4—4 of Fig. 3;

Fig. 5 is an elevation, partially broken away and shown in vertical section, of a further modified type of a warning member of the invention shown in association with a brake pedal;

Fig. 6 is an elevational view taken on line 6—6 of Fig. 5;

Fig. 7 is a view showing further details of the engagement of the positioning spring and motor driven control cam of Figs. 5 and 6; and Fig. 8 is a diagrammatic view of another embodiment of braking control means of the invention.

When referring to corresponding parts shown in the drawings and referred to in the specification, corresponding numerals are used to facilitate reference between equivalent parts on the drawings and referred to in the specification.

Figure 1:
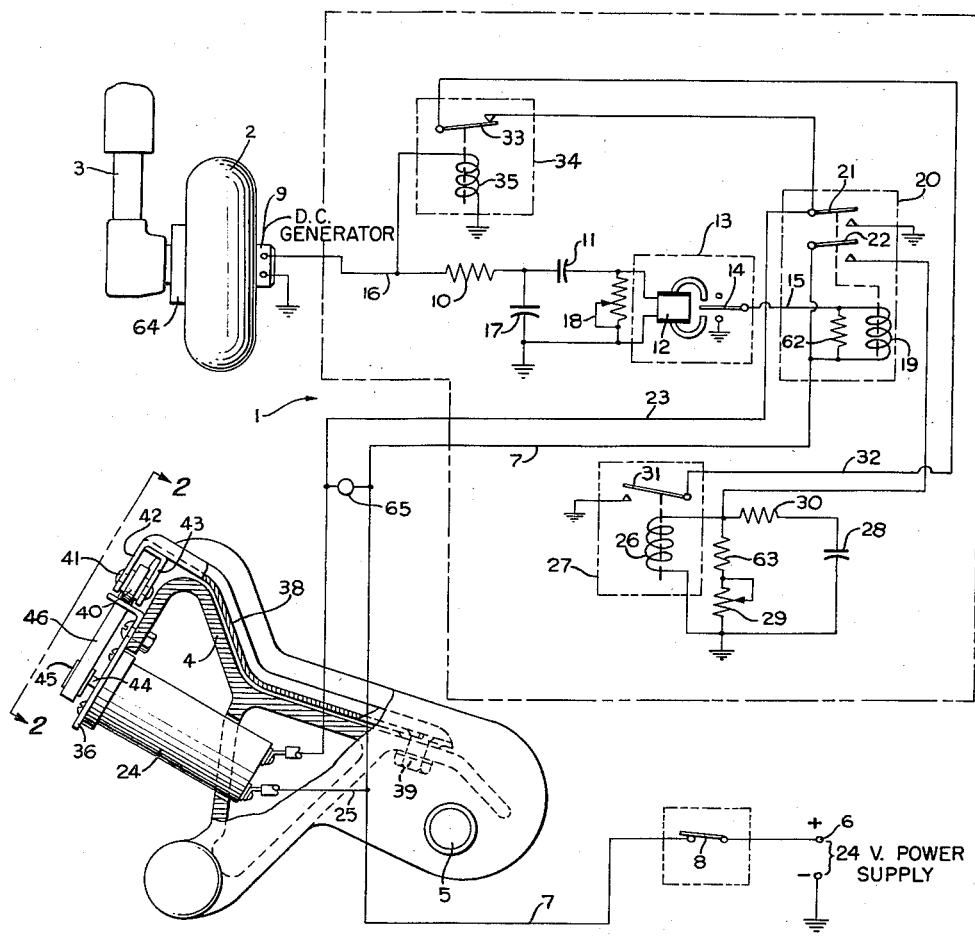
Fig. 1 is a diagrammatic elevation of a brake pedal and an aircraft wheel and support having a warning system of the invention associated therewith, which warning system and apparatus embody the principles of the invention.

The present invention broadly relates to the combination of an electric power supply circuit, means for association with and drive by a vehicle wheel and for closing said power supply circuit when the vehicle wheel is approaching skid conditions, brake pedal means for controlling the braking action on the vehicle wheel, electrically operated agitator means carried by the brake pedal means for physically contacting, or moving the foot of a person operating the brake pedal means, and electrical conduits connecting the power supply circuit to the agitator means for actuation thereof when the vehicle wheel is approaching skid conditions.

In order to understand the present invention completely, reference should be had to the details of the control or warning sensing circuit shown in the accompanying drawing, and the numeral 1 is used to refer to the skid warning system and mechanism of the invention as a whole. This skid warning system 1 is used in conjunction with a conventional aircraft wheel 2, oleo support strut 3, and a brake pedal 4. The brake pedal is journalled on a suitable support shaft 5, as by engaging part of the sidewalls of the brake pedal 4. The remaining portions of the aircraft are not shown and form no part of the present invention.

A conventional power supply for the skid warning system of the invention is provided and a terminal 6 connects to a 24-volt D.C. supply, for example. However, A.C. or pulsating D.C. power supplies may be used, as desired. Power is supplied to the sensing circuit by a power supply lead 7 in which the control switch 8 is provided. This control switch 8 is normally positioned in the aircraft control cock pit and can be used to disconnect the skid warning system, when desired.

Power for controlling the skid warning system 1 of the invention is furnished by a D.C. generator 9 suitably associated with and driven by the wheel 2 with which the apparatus is to be used so that such generator 9 is driven at a speed proportional to the rotating speed of the wheel. The generator 9 when used with a large diameter wheel, such as a bomber wheel, has a capacity to generate 80 volts per 1000 r.p.m. at 8 watts, and when used with a smaller wheel diameter, for example used on a fighter airplane, is of a size or capacity to generate 40 volts per 1000 r.p.m. again at 8 watts. Energy supplied from the generator 9, as long as the speed of such generator is changing, will flow via lead 16 through a resistance 10 (1000 ohms) and a condenser 11 (12 mfd.) and through an operating coil 12 of a normally open, polarized relay 13 used in the sensing circuit, as one important element thereof, to a ground connection. The relay 13 has a coil resistance of 2000 ohms and an operating voltage of .5 volt. It will be seen that current will flow through this operating coil 12 and the condenser 11 when the generator is decelerating and when such rate of deceleration is of a sufficient predetermined amount that a current of required strength and polarity will flow through the coil 12 to actuate the polarized relay 13 and close a circuit to ground from the power supply lead 7, relay 20, switch 14, and lead 15, as hereinafter described in more detail. Current also will flow through the coil 12 when the wheel 2 is accelerated and, if a sufficient amount of current flows, the polarized relay will be actuated in an opposite direction. A further control could be regulated by such acceleration actuation of the polarized relay 13, if desired, but is not normally used in the present invention and the contact on this side of the relay is not connected.

A condenser 17 (12 mfd.) is connected from ground to the connection between resistance 10 and condenser 11. The resistance 10 and condenser 17 form a filter circuit for ripple current flowing from the generator 9. A potentiometer 18 (25K) is connected in series with the condenser 11 and in parallel with the operating coil 12 to vary the sensitivity of such coil to deceleration of the wheel 2.

When the generator 9 is decelerating from excessive braking forces on the wheel 2 to send a pulse of energy through the coil 12, the polarized relay 13 will temporarily close the switch 14 to ground, which connects lead 15 to an operating coil 19 of a normally open control relay 20 and to actuate it. Power flows to the operating coil 19 from the power supply lead 7, when the switch 14 closes the ground circuit for such coil. The relay 20 has an operating voltage of from 18 to 30 volts and a coil resistance of 552 ohms. This normally open control relay 20 controls switches 21 and 22. The switch 21 connects to ground and to a lead 23 that extends to an actuator member, such as an electric motor 24, which is directly carried by the brake pedal 4 and functions as hereinafter explained in more detail. The power supply circuit for such motor 24 is completed by a lead 25 that connects to the power supply lead 7 of the skid warning system so that a power supply circuit for such motor 24 is completed whenever the polarized operating relay 13 is energized upon such deceleration of the wheel 2 so as to close the polarized relay 13, the relay 20 and the switch 21. It will be understood that the values given above and hereafter for the various components constitute one specific example and are not limiting.

*Locked wheel notification control*

The second control switch 22 of the relay 20 connects to the power supply lead 7 and couples it to an operating coil 26 of a third normally open relay 27 which has a slow release circuit means connected thereto for operation when continued deceleration of the wheels occurs. The relay 27 has a coil resistance of 12,000 ohms, a drop-out voltage of 3.6 volts and a pickup voltage of 7.2 volts. This slow release circuit means comprises a condenser 28 (150 mfd.) connected in the circuit with the operating coil 26 and with current limiting resistance 63 (5600 ohms) and variable resistance 29 (.1 meg.). The resistances 63 and 29 are connected in parallel with such operating coil 26. A further limiter resistance 30 (27 ohms) is connected in series with the condenser 28. Thus after a pulse of energy has been transmitted to the coil 26 and associated means, the condenser 28 will be charged and current will slowly leak from such condenser 28 through the operating coil 26 to maintain such relay 27 and a switch 31 controlled thereby closed for a predetermined period, such as approximately two, three or four seconds, as desired. Variation in the values of the resistance 29 provided in the control circuit for the relay 27 will permit an accurate control of the time delay during which the relay 27 is maintained in its closed position.

The switch 31, controlled by the relay 27, connects a ground connection through a lead 32 to a normally closed switch 33 controlled by a fourth relay 34 having the same characteristics as relay 27. The opposite contact of the switch 33 connects to the power circuit lead 23 of the motor 24. Hence, as long as the switches 31 and 33 remain closed, the actuation of the motor 24 continues as such switches complete the ground circuit therefor. Such energization circuit is closed at practically the same instant that switch 21 is closed for initial temporary energization of the motor 24.

The relay 34 is opened on reacceleration of the wheel 2 and an operating coil 35 of the relay 34 connects to the lead 16 to receive energy therefrom upon reacceleration of the wheel 2. Thus upon reacceleration of the wheel 2, the relay 34 is opened, and if the time delay relay 27 and switch 31 are still closed at such time, then the locked wheel ground circuit will be opened and cause the skid indicator or warning means of the invention to cease to operate, as will be described hereinafter in more detail.

It will be realized that the skid warning system of the invention is actuated by an undesirable rapid deceleration of the vehicle wheel with which the warning system of the invention is associated. Thus actually such wheel usually will be slipping with relation to the ground and approaching condition when the sensing system is actuated to energize or release the vibrator indicator means of the invention. From tests conducted on braked aircraft wheels, it is noted that effective brake action is obtained even if the wheel (tire) is slipping with relation to the ground. That is, the braked wheel is moving at a slower speed than an unbraked wheel on the aircraft. Thus a theoretical figure of about 20 percent slippage between the brake wheel and an unbraked wheel on a vehicle has been thought to be a maximum value for such slippage for effective braking action. However, it is very difficult to maintain this amount of slippage and it also is difficult to measure the slippage accurately. In all events, a braking rate to produce a deceleration of the vehicle and unbraked wheel of about 10 ft. per second/per second is considered a very effective braking action in most instances. When greater braking forces are applied, effective braking action may still be secured but the braked wheel is then very apt to go very rapidly into skidding conditions. When conditions immediately approaching skidding exist, the braked wheel has been observed to have a rate of deceleration of well over 50 radians per second/per second. Thus the invention contemplates, as one example, having the polarized relay 13 actuated when a deceleration rate of about 50 radians per second/per second exists. Adjustment of the potentiometer 18 will vary the deceleration rate required to actuate the polarized relay 13. The invention can be considered to be operating when skid conditions have actually been established so that the terminology skid warning system is broadly used in the specification and claims to cover actuation of the indicator means when either skid conditions exist or when an undesirably rapid deceleration of the wheel is being effected so that the wheel may be approaching skid conditions. When the wheel is skidding, it is considered to be decelerating too rapidly as such expression is used in the specification and claims.

*Physical warning means*

Figure 2:
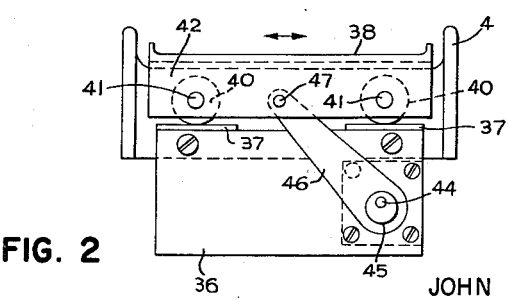
Fig. 2 is an elevation of the brake pedal taken on line 2—2 of Fig. 1.

In the embodiment of the invention shown in Figs. 1 and 2, the electric motor 24 is directly secured to the brake pedal 4 by means of a bracket plate 36 which has two transversely spaced flanges 37 at the upper margins thereof, as best indicated in Fig. 2 of the drawings. An auxiliary brake pedal plate 38 is provided and is secured on the top surface of the brake pedal 4 for pivotal action with relation thereto, as by means of a rivet or bolt 39 at one end of this auxiliary brake pedal 38 to leave the end adjacent the motor 24 free for pivotal action. Such free end of the auxiliary brake pedal 38 is supported by a pair of rollers 40, 40 on the flanges 37, 37 and with the rollers being journalled on spindles or pins 41 carried by a flanged end 42 of the auxiliary brake pedal 38 and by a separate flange plate 43 suitably secured thereto. In order to vibrate or move the auxiliary brake pedal 38, the motor 24 has an output shaft 44 which has a cam 45 secured thereto. A connector link 46 connects this cam 45 to the free end portion of the auxiliary brake pedal 38 by engaging with a pin 47, for example, thereon. Thus as the shaft 44 rotates, the free end portion of the auxiliary brake pedal will be rapidly oscillated back and forth on the rollers 40, 40 and a physical indication that the skid approaching or actual skid conditions exists will be immediately and positively transmitted to the foot of the person operating this brake pedal 4. Such indication will be given appreciably before the pilot would be otherwise aware that excessive braking forces had been applied.

Figs. 3 and 4 of the drawings show a modified vibrator assembly means of the invention and in this instance, a brake pedal 48 is used and it has a conventional D.C. electromagnetic vibrator unit 49 secured thereto by means of a retaining strap 50. The retaining strap 50 positions the vibrator unit 49 on the under surface of the brake pedal 48. A hole 51, or equivalent, is drilled or otherwise formed in the brake pedal 48 and an armature or pin 52 of the vibrator unit 49, which is controlled by the vibrator unit and is caused to oscillate axially when the vibrator unit is energized, extends into this hole 51 and is normally positioned immediately adjacent the top surface of the brake pedal. Hence, when the sensing means of the invention connected to such vibrator unit 49 energizes the unit, it will cause a physical pounding or striking action on the pilot's foot and will indicate that undesirable conditions exist on the braked wheel.

Another type of a physical skid warning member and associated means is shown in Figs. 5, 6 and 7 of the drawings, and in this instance a brake pedal 53 is shown that has an electric motor 54 secured thereto as by means of a bracket 55. An output shaft 56 of the motor 54 has a cam 57 secured thereto. This cam 57 is adapted to bear against a cam follower 58 secured to or comprising the end portion of a cantilever section of a leaf spring 59. This spring 59 is secured to the bracket 55 adjacent the opposite end of the motor 54 from the cam 57. The spring 59 has a striker pin 60 suitably secured thereto spaced from a fixed end of the spring. Such pin 60 extends through a hole 61 provided in the brake pedal 53 and with the pin being adapted to be oscillated back and forth rapidly substantially along its own axis when the motor 54 is energized and this will cause the pin 60 to strike the foot of the person using the brake pedal 53 for braking action. The cam 57 has an eccentric camming surface extending around about ¾ of its circumference and terminating in a shoulder or step for release of the spring 59. The cam follower 58 and cam 57 gradually force the spring 59 away from the brake pedal 53 so that a snap action is secured as the spring 59 is released by the cam and impacts or thumps are produced by the pin 60 striking a pilot's foot when the motor 54 is energized to warn of skid conditions in the braked wheel or wheels controlled by the brake pedal 53.

Fig. 1 shows that a resistance 62 (1000 ohms) is connected across the operating coil 19 of the control relay 20 and it is provided when the arcing of the contact 14, when opened, is to be controlled.

Conventional brake means 64 are shown in association with the wheel 2.

Fig. 1 of the drawings also shows that an indicator member 65 may be connected across the leads 7 and 23 in parallel with the motor 24. Such indicator member 65, for example, may be a light, or a buzzer to give a visual, or an audible signal to the pilot to show that some component of the agitator means is not functioning. Thus at such time, if a physical signal is not being received, the pilot would know that his skid warning system is not working properly. However, a feature of this invention is that the prime signal to the person applying a braking force is physically transmitted to such person's foot. He instinctively will almost instantly recoil or remove braking forces on the brake pedal when such agitator signal is received and little or no thought process will be required, it is believed, to reduce the forces being applied to the brake pedal.

A further modification of the invention is shown in Fig. 8 wherein a positive anti-skid action or control apparatus is shown. A wheel 66 has a D.C. generator 67 driven thereby and connected to a sensing means 68, for example, as disclosed hereinabove or as in my prior joint application referred to hereinbefore. Such sensing means 68 is actuated on undesirable deceleration of the wheel 66 and at such time would energize agitator means 69 on a brake pedal, as described hereinbefore. The sensing means also energizes coil 74 of solenoid valve 71 to operate the valve 70 thereof to open the line supplying braking fluid to a brake 72 by a conduit 73, and to hold such line open a desired length of time, or until wheel reacceleration occurs. The valve 70 of solenoid valve 71, when actuated, connects the brake pressure supply to a return line 75, for example, to remove, relieve, or limit actuating pressure on the brake 72. Thus in this instance, the wheel 66 would automatically have braking forces removed therefrom when excessive deceleration occurs. The sensing means 68 would permit renewal of braking action upon wheel reacceleration.

When it is desired to indicate the presence of skidding conditions or approaching such a condition in a plurality of wheel units, such as on an airplane wherein two braked wheels each on a separate support and two brake pedals are provided, then a separate sensing means would be incorporated with each braked wheel and a separate physical warning means or unit of the invention would be associated with each brake pedal. When more than one wheel is carried on one support strut for the airplane, then usually only one sensing means and one brake pedal is utilized for the plurality of wheels.

The sensing means used in the control of the invention may be of any suitable known construction, such as disclosed in the patent previously mentioned. Such sensing means must indicate, usually by an electrical pulse, that excessive braking forces have been applied to the braked wheel and that skid conditions are approaching. This indication from the braked wheel is then used to actuate the physical warning means of the invention on the brake pedal. The sensing means described would broadly include the generator 9, control relays 13, 20, 27 and 34, and associated circuits. Parts or all of such sensing means can be varied, as desired, and a fluid motor, for example, might be substituted for the electric motor 24 or equivalent motors disclosed. Also, some controls, such as the locked wheel notification means, may be omitted and still have effective skid warning action by the other components of the combination of the invention.

From the foregoing it is seen that several novel and useful types of skid warning means have been provided by the invention and that the objects thereof have been achieved.

While a certain representative embodiment and details have been shown for the purposes of illustrating the invention, it will be apparent to those skilled in this art that various changes and modifications may be made therein without departing from the spirit or scope of the invention.

What is claimed is:

1. Skid indicator apparatus for combination with a vehicle and a brake pedal thereon, which apparatus comprises sensing means for connection to a vehicle wheel to indicate when such wheel is decelerating at an undesirable rate, electrically operated agitator means for positioning on the brake pedal for contacting the foot of a person using such pedal, and a power supply for said agitator means, said sensing means being adapted to be connected to said power supply for closing the power circuit for said agitator means when the wheel is decelerating at an undesirable rate to provide a physical indication of such action to a person actuating the brake pedal.

2. Skid indicator apparatus for combination with a vehicle and a brake pedal thereon, which apparatus comprises sensing means for association with and control by a vehicle wheel to indicate when such wheel is approaching skid conditions, agitator means engaging the brake pedal for contacting the foot of a person using such pedal, and control means for said agitator means, said sensing means being connected to said control means for actuation of said agitator means when the wheel is approaching skid conditions to provide a physical indication of such action to a person actuating the brake pedal.

3. In combination, an electric power supply circuit, means for association with and drive by a vehicle wheel and for closing said power supply circuit when the vehicle wheel is approaching skid conditions, brake pedal means for controlling the braking action on the vehicle wheel, electrically operated agitator means carried by the said brake pedal means for contacting the foot of a person operating said brake pedal means, and electrical conduits connecting said power supply circuit to said agitator means for actuation thereof when the vehicle wheel is approaching skid conditions.

4. Skid indicator apparatus for combination with a vehicle and a brake pedal thereon, which apparatus comprises an electrical generator for connection to a vehicle wheel to indicate the rotational speed of such wheel by the output of the generator, sensing means for connection to said generator for actuation when the wheel is being decelerated at an undesirably rapid rate, electrically operated agitator means for engaging the brake pedal for contacting the foot of a person using such pedal, and a power supply for said agitator means, said sensing means being connectable to said power supply for closing the power circuit for said agitator means when the wheel is approaching skid conditions to provide a physical indication of such action to a person actuating the brake pedal.

5. Skid indicator apparatus in combination with a vehicle wheel and a brake pedal on a vehicle and controlling braking action of such wheel, which apparatus comprises an electrical generator connected to and driven by a vehicle wheel to measure the rotational speed of such wheel by the output of the generator, sensing means connected to said generator for actuation when the wheel is being decelerated at an undesirably rapid rate, electrically operated agitator means engaging the brake pedal for contacting the foot of a person using such pedal, and a power supply for said agitator means, said sensing means being connected to said power supply for closing the power circuit for said agitator means when the wheel is approaching skid conditions to provide a physical indication of such action to a person actuating the brake pedal, said sensing means including a separate control connected to said generator for de-energization of said agitator means upon acceleration of said wheel after energization of said agitator means.

6. Apparatus as in claim 1 wherein said agitator means comprises a pedal section, means pivotally securing one end of said pedal section to the brake pedal on the upper surface thereof, roller means positioning the opposite end of said pedal section on said brake pedal for limited transverse movement thereon, an electric motor carried by the brake pedal and controlled by said sensing means, and cam and link means connecting the output shaft of said motor to the said opposite end of said pedal section to oscillate such pedal section on energization of said motor.

7. Apparatus as in claim 1 wherein said agitator means comprises a pedal section, means movably securing said pedal section to the brake pedal on the upper surface thereof, an electric motor carried by the brake pedal and controlled by said sensing means, and means connecting the output shaft of said motor to the said pedal section to vibrate such pedal section on energization of said motor.

8. In combination with a brake pedal, an electric motor having an output shaft, means securing said electric motor to the brake pedal spaced from the top surface thereof, a leaf spring secured adjacent one end to said brake pedal and having a cantilever end adjacent the brake pedal, cam means on said electric motor output shaft, cam follower means connecting said cam means and leaf spring for moving a portion of such spring away from the brake pedal and then releasing such spring on each rotation of said output shaft, and a striker pin carried by said leaf spring for striking a person's foot on the brake pedal when said electrical motor is actuated to pull said leaf spring away from the brake pedal and said leaf spring is released.

9. In combination with a brake pedal, a motor having an output shaft, means securing said motor to the brake pedal, a leaf spring secured adjacent one end to said brake pedal and having a cantilever end adjacent the brake pedal, cam means on said motor output shaft, cam follower means connecting said cam means and leaf spring for moving a portion of such spring away from the brake pedal and then releasing such spring on each rotation of said output shaft, and a striker pin carried by said leaf spring and extending through a hole in said brake pedal for striking a person's foot on the brake pedal when said electrical motor is actuated to drive said cam.

10. In combination with a brake pedal, an electric motor having an output shaft, means securing said electric motor to the brake pedal, a leaf spring carired by said brake pedal, cam means on said electric motor output shaft, said cam means and leaf spring being operatively engaged for moving said leaf spring on each rotation of said output shaft, and a striker pin carried by said leaf spring for striking a person's foot on the brake pedal when said electrical motor is actuated.

11. A sensing circuit and indicator means for a braked vehicle wheel skid warning system, which circuit comprises D.C. generator means adapted to be driven at a speed proportional to that of braked wheel, polarized relay means for being closed only upon initial deceleration of the wheel, a second control relay connected to said polarized relay for being closed by actuation of said polarized relay, a third control relay connected to and closed by actuation of said second control relay, means for maintaining said third control relay closed for a desired length of time, physical warning means for the operator of the brakes on the vehicle wheel, and power means for said physical warning means connected to and controlled by said third control relay for operation of said physical warning means when said third control relay is closed.

12. Apparatus as in claim 11 wherein said third control relay has a normally closed relay connected in its circuit, and menas connecting said D.C. generator to said normally closed relay to open it and the power circuit for said physical warning means on reacceleration of the braked wheel.

13. A sensing circuit for a braked vehicle wheel skid warning system, which circuit comprises D.C. generator means adapted to be driven at a speed proportional to that of braked wheel, polarized relay means for being closed only upon initial deceleration of the wheel, a second control relay connected to said polarized relay for being closed by actuation of said polarized relay, a third control relay connected to and closed by actuation of said second control relay, means for maintaining said third control relay closed for a desired length of time, and a normally closed relay connected in the circuit of said third control relay and connected to said D.C. generator to be actuated and opened when the braked wheel reaccelerates, said third control relay being connected to an output circuit for sending electrical control currents thereto.

14. Skid indicator apparatus for combination with a vehicle and a brake pedal thereon, which apparatus comprises sensing means for association with and control by a vehicle wheel to indicate when such wheel is approaching skid conditions, agitator means engaging the brake pedal for contacting the foot of a person using such pedal, control means for said agitator means, said sensing means being connected to said control means for actuation of said agitator means when the wheel is approaching skid conditions to provide a physical indication of such action to a person actuating the brake pedal, and indicator means connected in parallel with said agitator means for simultaneous energization therewith to indicate when any failure has occurred in said agitator means.

15. Skid indicator, or warning apparatus for combination with a vehicle, a vehicle wheel, a hydraulic brake on the wheel, and a brake pedal on the vehicle, which apparatus comprises an electric generator for connection to and drive by a vehicle wheel to indicate the rotational speed of the wheel by the output of the generator, sensing means for connection to said generator for actuation when the wheel is being decelerated at an undesirably rapid rate, electrically operated agitator means for engaging the brake pedal for contacting the foot of a person using such pedal, a power supply for said agitator means, said sensing means being connectable to said power supply for closing the power circuit for said agitator means when the wheel is being decelerated at an undesirably rapid rate to provide a physical indication of such action to a person actuating the brake pedal, and a solenoid valve mechanism connected in the fluid circuit for actuation of the brakes, said sensing means being connected to said solenoid valve to actuate it and release brake pressure fluid to remove braking forces on the wheel when said sensing means is actuated.

References Cited in the file of this patent

UNITED STATES PATENTS

| | | |
|---|---|---|
| 2,128,250 | Howard | Aug. 30, 1938 |
| 2,185,329 | Caldwell | Jan. 2, 1940 |
| 2,280,186 | Caldwell | Apr. 21, 1942 |
| 2,284,040 | Caldwell | May 26, 1942 |
| 2,436,341 | Weybrew | Feb. 17, 1948 |
| 2,753,017 | Curl et al. | July 3, 1956 |
| 2,799,462 | Steingerwald | July 16, 1957 |
| 2,815,503 | Amos | Dec. 3, 1957 |